US012191713B2

United States Patent
Hisada et al.

(10) Patent No.: US 12,191,713 B2
(45) Date of Patent: Jan. 7, 2025

(54) ROTOR OF ROTARY ELECTRIC MACHINE

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Hideki Hisada, Kuwana Mie (JP); Masaru Kano, Yokkaichie Mie (JP); Hidenori Uchida, Mie Mie (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 227 days.

(21) Appl. No.: 18/065,367

(22) Filed: Dec. 13, 2022

(65) Prior Publication Data
US 2023/0114962 A1 Apr. 13, 2023

Related U.S. Application Data

(63) Continuation of application No. PCT/JP2021/035924, filed on Sep. 29, 2021.

(51) Int. Cl.
*H02K 1/276* (2022.01)
(52) U.S. Cl.
CPC .................................. *H02K 1/276* (2013.01)
(58) Field of Classification Search
CPC ..................................................... H02K 1/276
See application file for complete search history.

(56) References Cited

U.S. PATENT DOCUMENTS

| 2012/0200185 A1 | 8/2012 | Sano et al. |
| 2014/0077650 A1 | 3/2014 | Takahashi |
| 2015/0137632 A1 | 5/2015 | Takahashi |
| 2015/0236555 A1 | 8/2015 | Takeda et al. |

FOREIGN PATENT DOCUMENTS

| JP | 5382012 B2 | 1/2014 |
| JP | 2014-50208 A | 3/2014 |
| JP | 2014-60836 A | 4/2014 |
| JP | 2015-171158 A | 9/2015 |

(Continued)

OTHER PUBLICATIONS

Japan Patent Office, International Search Report in International Application No. PCT/JP2021/035924 (3 pages, and machine translation, 6 pages).

*Primary Examiner* — Ramon M Barrera
(74) *Attorney, Agent, or Firm* — Finnegan, Henderson, Farabow, Garrett & Dunner, LLP

(57) ABSTRACT

According to one embodiment, a rotor of a rotary electric machine is provided with a rotor iron core and a plurality of permanent magnets. The rotor iron core includes a plurality of magnetic poles, a plurality of magnet holding slots, an outer peripheral side iron core portion, an inner peripheral side iron core portion, a plurality of bridges passed between the outer peripheral side iron core portion and the inner peripheral side iron core portion, and a plurality of magnet holding protrusions extending from the middle of each of the bridges to each of the magnet holding slots for each of the magnetic poles. Each of the permanent magnets is accommodated in each of the magnet holding slots and is in contact with each of the magnet holding protrusions.

5 Claims, 6 Drawing Sheets

(56) References Cited

FOREIGN PATENT DOCUMENTS

| | | |
|---|---|---|
| JP | 5936060 B2 | 6/2016 |
| JP | 5991545 B2 | 9/2016 |
| JP | 2018-46703 A | 3/2018 |
| JP | 6828635 B2 | 2/2021 |
| JP | 6848135 B1 | 3/2021 |
| WO | WO 2018/180636 A1 | 10/2018 |

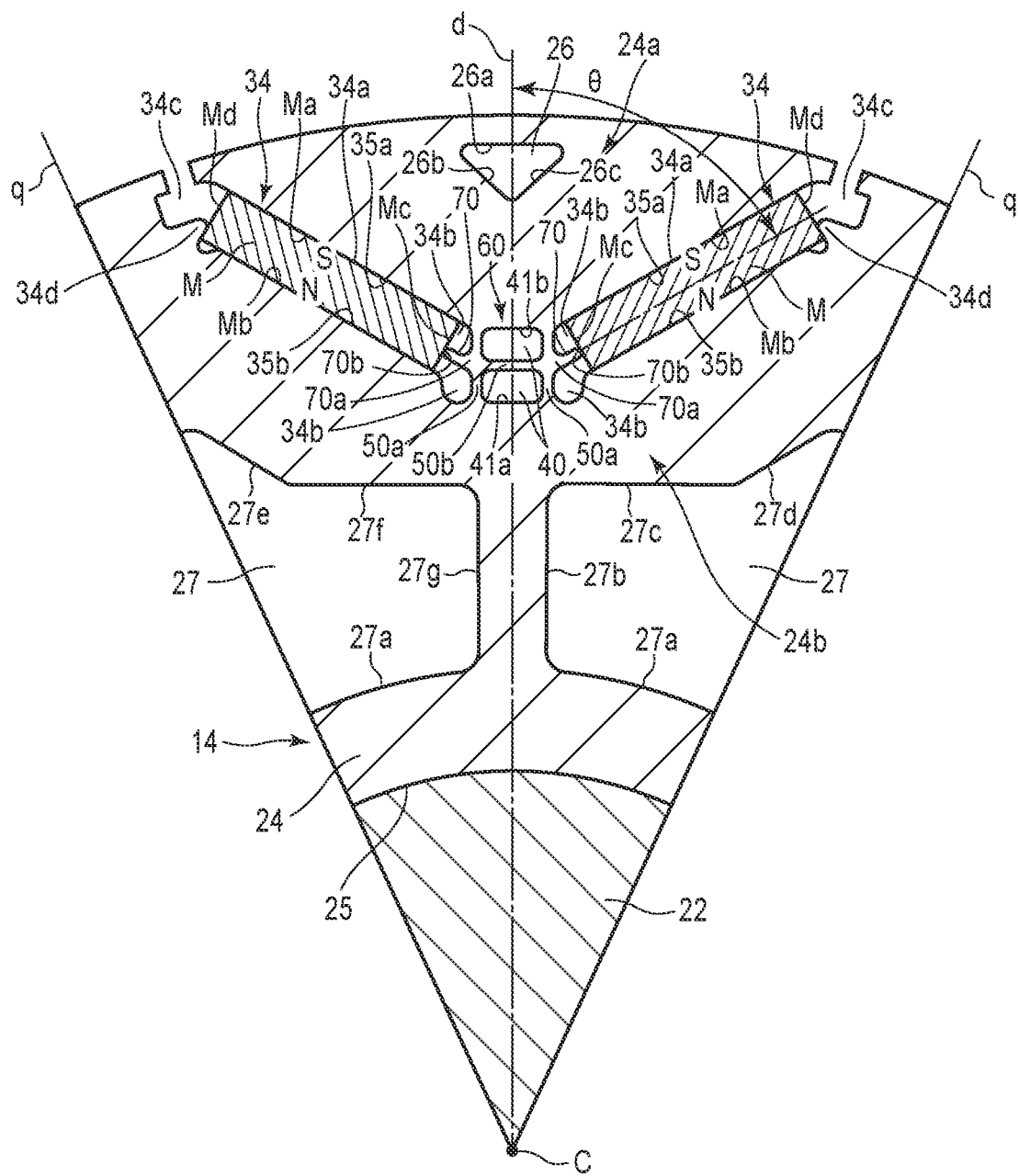
F I G. 2

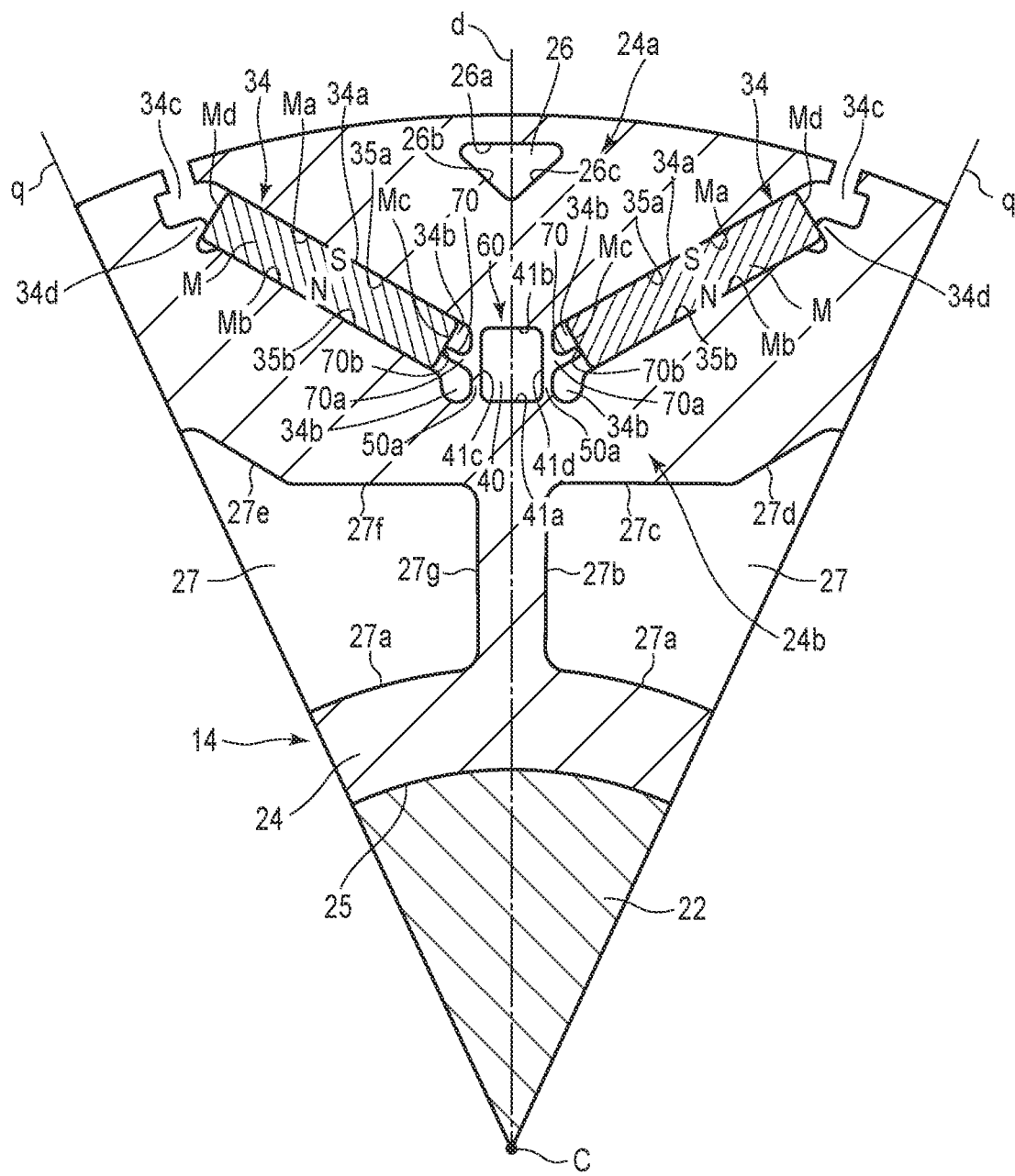
F I G. 6

ROTOR OF ROTARY ELECTRIC MACHINE

CROSS-REFERENCE TO RELATED APPLICATIONS

This application is a Continuation Application of PCT Application No. PCT/JP2021/035924, filed Sep. 29, 2021, the entire contents of which are incorporated herein by reference.

FIELD

Embodiments described herein relate generally to a rotor of a rotary electric machine having a permanent magnet.

BACKGROUND

In recent years, due to remarkable research and development of permanent magnets, permanent magnets with a high magnetic energy product have been developed, and permanent magnet type rotary motors using such permanent magnets are being applied as electric motors or generators in trains and automobiles. Usually, a permanent magnet type rotary electric machine is provided with a cylindrical stator and a cylindrical rotor that is rotatably supported inside the stator. The rotor is provided with a rotor iron core and a plurality of permanent magnets embedded in the rotor iron core.

As such a permanent magnet type rotary electric machine, a rotary electric machine with a configuration in which two magnets per magnetic pole are arranged in a V-shape, and in which magnet slots accommodating the magnets are open to the surface of the rotor iron core, has been proposed. In the rotary electric machine with the above configuration, a magnetic flux leakage of magnets in a bridge of the rotor iron core can be reduced, and a magnet torque generated per magnet weight can be increased. It is also possible to reduce the magnet weight while maintaining the torque of the rotary electric machine.

However, in this configuration, under a situation in which a large torque is generated, a circumferential electromagnetic force applied to an iron core portion located inside the V-shaped arranged magnets causes strong bending stress to be applied to the bridge located near the center of the magnetic poles. Therefore, there is a possibility that the bridge may lack strength. Alternatively, in a case where the bridge is made thicker for stress resistance, the magnetic flux leakage will increase, making it difficult to reduce the magnet weight.

Embodiments described herein aim to provide a rotor of a rotary electric machine which can be made smaller and lighter while maintaining the strength of a rotor iron core, and which can avoid irreversible demagnetization of permanent magnets.

BRIEF DESCRIPTION OF THE DRAWINGS

FIG. 2 is an enlarged cross-sectional view of a part of a rotor of the rotary electric machine according to the first embodiment.

FIG. 6 is an enlarged cross-sectional view of a part of a rotor of a rotary electric machine according to a third embodiment.

DETAILED DESCRIPTION

Figure 1:
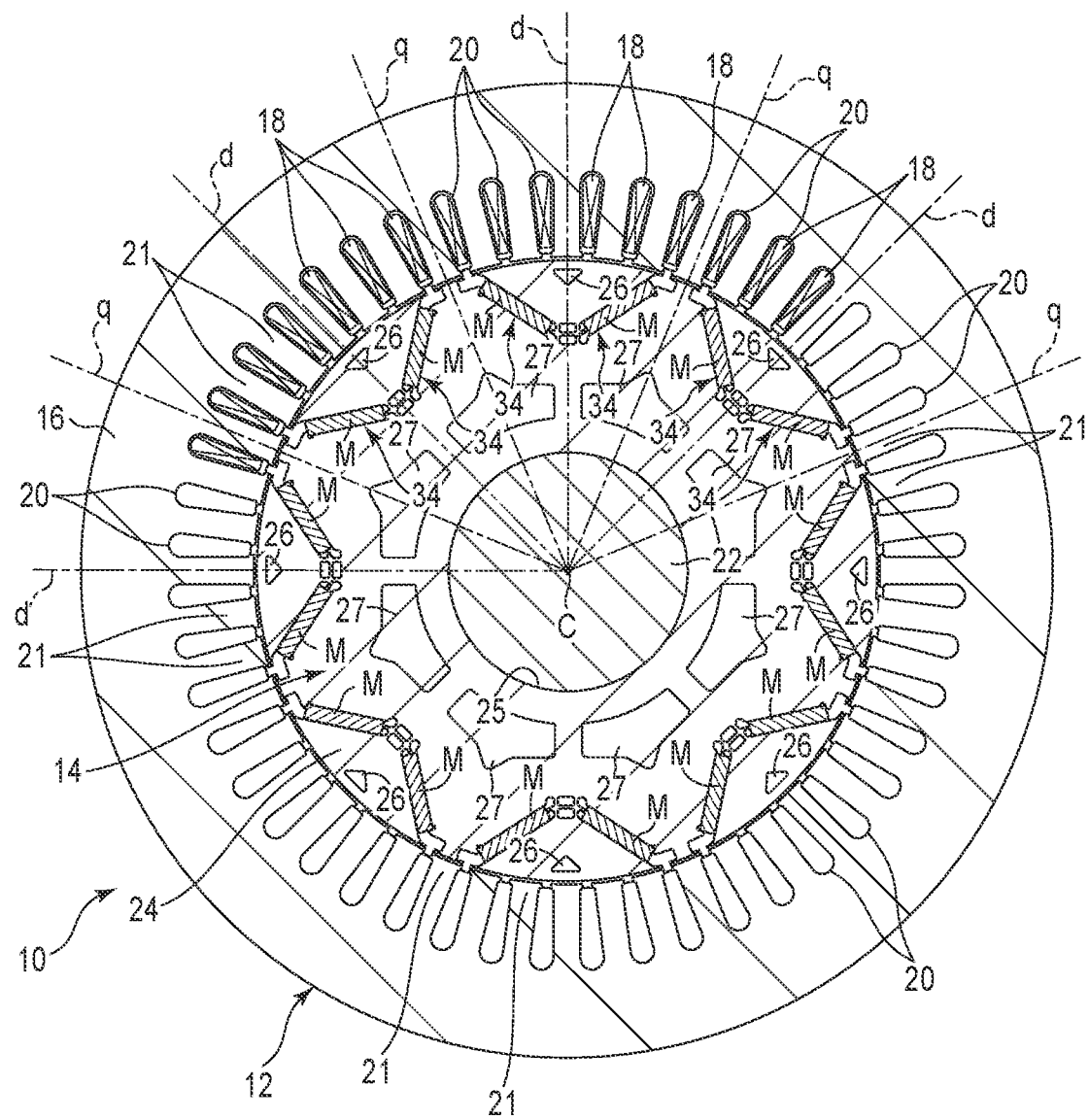
FIG. 1 is a cross-sectional view of a permanent magnet type rotary electric machine according to a first embodiment.

In general, according to one embodiment, a rotor of a rotary electric machine is provided with a rotor iron core and a plurality of permanent magnets. The rotor iron core includes a plurality of magnetic poles lined up in a circumferential direction around a central axis, a plurality of magnet holding slots arranged at intervals in the circumferential direction for each of these magnetic poles, an outer peripheral side iron core portion located between each of the magnet holding slots in the circumferential direction for each of the magnetic poles, an inner peripheral side iron core located between each of the magnet holding slots and the central axis for each of the magnetic poles, a plurality of bridges passed between the outer peripheral side iron core and the inner peripheral side iron core at locations between each of the magnet holding slots for each of the magnetic poles, and a plurality of magnet holding protrusions extending from the middle of each of the bridges to each of the magnet holding slots for each of the magnetic poles. Each of the permanent magnets is accommodated in each of the magnet holding slots and is in contact with each of the magnet holding protrusions.

Embodiments will be described hereinafter with reference to the accompanying drawings. Throughout the embodiments, common elements are denoted by like reference numerals, and a detailed description thereof may be omitted unless otherwise necessary. Further, in order to make the description clearer, the widths, thicknesses, shapes, etc., of the respective parts are schematically illustrated in the drawings, compared to the actual modes. These parts can be redesigned or remodeled as needed with reference to the following descriptions and the conventional techniques.

[1] First Embodiment

FIG. 1 is a cross-sectional view of a permanent magnet type rotary electric machine according to a first embodiment, and FIG. 2 is an enlarged cross-sectional view of one magnetic pole portion of the rotor.

As shown in FIG. 1, a rotary electric machine 10 is, for example, configured as an inner rotor type rotary electric machine, and is provided with an annular or cylindrical stator 12 supported by a fixed frame not shown in the drawing, and a rotor 14 supported rotatably around a central axis C inside the stator and coaxially with the stator 12. The rotary electric machine 10 is, for example, suitably applied to a drive motor or a generator in a hybrid electric vehicle (HEV) or an electric vehicle (EV).

The stator 12 is provided with a cylindrical stator iron core 16 and armature winding (coil) 18 wound on the stator iron core 16. The stator iron core 16 is configured by a number of circular electromagnetic steel plates (iron core pieces) made of magnetic materials, such as silicon steel, laminated in a concentric manner. A plurality of slots 20 are formed on an inner periphery of the stator iron core 16. The plurality of slots 20 are lined up at equal intervals in a circumferential direction. Each slot 20 opens to an inner peripheral surface of the stator iron core 16 and extends radially from this inner peripheral surface. Furthermore, each slot 20 extends over the entire length of the stator iron core 16 in an axial direction. By forming a plurality of slots 20, the inner periphery of the stator iron core 16 configures a plurality of stator teeth 21 (for example, 48 in the present embodiment) facing the rotor 14. The armature winding 18 is inserted into a plurality of slots 20 and wound around each stator teeth 21. By applying a current to the armature winding 18, a predetermined interlinkage magnetic flux is formed in the stator 12 (stator teeth 21).

The rotor 14 includes a cylindrical shaft (rotor shaft) 22, which is rotatably supported at both ends by bearings not shown in the drawing, a cylindrical rotor iron core 24 fixed to a substantially central portion in the axial direction of the shaft 22, and a plurality of permanent magnets M embedded in the rotor iron core 24. The rotor 14 is coaxially arranged inside the stator 12 with a small gap (air gap). In other words, the outer peripheral surface of the rotor 14 faces the inner peripheral surface of the stator 12 with a small gap. The rotor iron core 24 has an inner hole 25 formed coaxially with the central axis C. The shaft 22 is inserted and fitted into the inner hole 25 and extends coaxially with the rotor iron core 24. The rotor iron core 24 is configured as a laminated body in which a number of circular electromagnetic steel plates (iron core pieces) made of magnetic materials, such as silicon steel, are laminated in a concentric manner. The rotor iron core 24 includes the aforementioned central axis C extending in the laminating direction of the iron core pieces, and an outer peripheral surface coaxial with the central axis C.

In the present embodiment, the rotor 14 includes a plurality of magnetic poles, for example, eight magnetic poles. In the rotor iron core 24, an axis extending in a radial direction of the rotor iron core 24 through the central axis C and a boundary between adjacent magnetic poles in the circumferential direction is referred to as a q-axis, and an axis that is electrically 90° apart from the q-axis in the circumferential direction, that is, an axis that passes through the center of the magnetic pole and the central axis C, is referred to as a d-axis. A direction in which the interlinkage magnetic flux formed by the stator 12 tends to flow is the q-axis. The d-axis and q-axis are provided alternately in the circumferential direction of the rotor iron core 24 and in a predetermined phase. One magnetic pole of the rotor iron core 24 refers to an area between two q axes adjacent to each other in the circumferential direction (⅛th circumferential angle area). As a result, the rotor iron core 24 is configured by eight poles (magnetic poles). The center of one magnetic pole in the circumferential direction is the d-axis.

As shown in FIG. 1 and FIG. 2, in the rotor iron core 24, a plurality of permanent magnets, for example, two permanent magnets M, are buried in each magnetic pole. In the circumferential direction of the rotor iron core 24, magnet holding slots 34 are formed on both sides of each d-axis for loading the permanent magnets M. The magnet holding slots 34 may be referred to as a magnet holding cavity or a magnet embedding hole. The two permanent magnets M are loaded and arranged in the magnet holding slots 34, respectively, and are fixed to the rotor iron core 24 by, for example, adhesives.

As shown in FIG. 2, each magnet holding slot 34 is formed in a manner penetrating the rotor iron core 24 in the axial direction. When viewed in a cross section orthogonal to the central axis C of the rotor iron core 24, the two magnet holding slots 34 are formed and arranged line-symmetrically with respect to the d-axis, for example, arranged side by side in a substantially V-shape.

Each magnet holding slot 34, which functions as a flux barrier, has a rectangular magnet loading area 34a that corresponds to a cross-sectional shape of the permanent magnet M and accommodates the permanent magnet M. The rotor iron core 24 has inner peripheral side magnetic gaps 34b extending from an inner peripheral side end of the magnet loading area 34a to the d-axis side, and an outer peripheral side magnetic gap 34c open from an outer peripheral side end of the magnet loading area 34a to the outer periphery of the rotor iron core 24.

The rotor iron core 24 has magnet holding protrusions 34d protruding from an inner edge (inner peripheral side long side) 35b at both longitudinal ends of the magnet loading area 34a into the outer peripheral side magnetic gap 34c.

The magnet loading area 34a is formed between the flat inner edge 35b and a flat outer edge (outer peripheral side long side) 35a that parallelly faces the inner edge 35b with a gap therebetween. The inner edge 35b and the outer edge 35a extend by inclining at an angle θ smaller than 90° with respect to the d-axis. In other words, the magnet loading area 34a is provided in an inclined manner such that a distance from the d-axis gradually increases from the inner peripheral side end toward the outer peripheral side end. The angle θ is not limited to the example shown in the drawing, and can be changed as desired.

The inner peripheral side magnetic gaps 34b extend from the inner peripheral side end (an end located on the d-axis side) of the magnet loading area 34a toward the d-axis. The inner peripheral side magnetic gaps 34b face each other at a distance from the d-axis. The outer peripheral side magnetic gap 34c extends from the outer peripheral side end (an end located on the outer peripheral surface side of the rotor iron core) of the magnet loading area 34a toward the outer peripheral surface of the rotor iron core 24, and is released or opens on the outer periphery of the rotor iron core 24.

The inner peripheral side magnetic gap 34b and the outer peripheral side magnetic gap 34c function as a flux barrier to prevent short-circuiting of the magnetic flux (also referred to as a magnet magnetic flux) at both longitudinal ends of the permanent magnet M, and also contribute to weight reduction of the rotor iron core 24. In particular, the outer peripheral side magnetic gap 34c, which is open to the outer periphery of the rotor iron core 24, suppresses short-circuiting of the magnet magnetic flux in the rotor iron core 24. As a result, the performance of the rotary electric machine 10 is improved, and in turn, the size and weight of the rotary electric machine 10 can be reduced.

The permanent magnet M is formed, for example, as an elongated flat plate with a rectangular cross section, and has a length approximately equal to the length of the rotor iron core 24 in an axial direction. The permanent magnet M is embedded over almost the entire length of the rotor iron core 24. The permanent magnet M may be configured by combining a plurality of divided magnets in the axial direction (longitudinal direction), in which case it is formed so that the total length of the plurality of magnets is approximately equal to the length of the rotor iron core 24 in the axial direction.

As shown in FIG. 2, each permanent magnet M has a rectangular cross-sectional shape, which has a pair of long sides facing each other in parallel and a pair of short sides facing each other. The cross-sectional shape of the permanent magnet M is not limited to a rectangular shape (rectangle), and may also be a parallelogram.

In the permanent magnet M, surfaces along each of the pairs of long sides become magnetic pole surfaces Ma and Mb where lines of magnetic force start and end, and surfaces along each of the pairs of short sides become non-magnetic surfaces Mc and Md where lines of magnetic force do not enter or exit. The permanent magnet M is loaded into the magnet loading area 34a of the magnet holding slot 34. With this loading, the magnetic pole surface Ma of the permanent magnet M abuts the outer edge 35a of the magnet loading area 34a, the magnetic pole surface Mb of the permanent magnet M abuts the inner edge 35b of the magnet loading area 34a, the non-magnetic pole surface Mc of the permanent magnet M faces the inner peripheral side magnetic gap 34b and abuts a magnet holding protrusion 70 described later, and the non-magnetic pole surface Md of the permanent magnet M faces the outer peripheral side magnetic gap 34c and abuts the magnet holding protrusion 34d. Due to these abutments, the permanent magnet M is held in the magnet loading area 34a in a state where its position in the longitudinal direction is positioned. The permanent magnet M may be fixed to the rotor iron core 24 by adhesives, etc. The two permanent magnets M located on both sides of the d-axis are arranged side by side in substantially a V-shaped manner. In other words, the two permanent magnets M are arranged in a manner such that their distance from the d-axis gradually increases from the inner peripheral side end toward the outer peripheral side end.

Each permanent magnet M is magnetized in a direction perpendicular to the long side. The two permanent magnets M located on both sides of the d-axis in the circumferential direction, i.e., the two permanent magnets M configuring one magnetic pole, are arranged in a manner such that the magnetization direction becomes the same. In addition, the two permanent magnets M located on both sides of each q-axis in the circumferential direction are arranged in a manner such that the magnetization direction becomes opposite. In the present embodiment, the rotary electric machine 10 configures an 8-magnetic pole (4-pole pair) permanent magnet embedded type rotary electric machine in which the front and back of the N pole and the S pole of the permanent magnet M are alternately arranged for each adjacent magnetic pole.

The rotor iron core 24 has a void hole (cavity) 26 for each magnetic pole at a position close to the outer peripheral surface and on the d-axis. The rotor iron core 24 has a void hole (cavity) 27 formed across each of the two magnetic poles at a position near the inner hole 25 and on the q-axis.

Each void hole 26 has a cross-sectional shape of an approximately isosceles triangle consisting of three sides, and is formed over the entire length of the rotor iron core 24 in the axial direction. Of the three inner peripheral surfaces 26a, 26b, and 26c forming each void hole 26, the inner peripheral surface 26a corresponding to the base of the isosceles triangle is close to the rotor iron core 24 in a state where it is orthogonal to the d-axis while the remaining two inner peripheral surfaces 26b and 26c are inclined toward the d-axis in a manner such that they gradually move away from the outer peripheral surface.

Each void hole 27 has a polygonal cross-sectional shape consisting of seven sides, and is formed over the entire axial length of the rotor iron core 24. Of the seven inner peripheral surfaces 27a to 27g forming each void hole 27, the largest inner peripheral surface 27a faces the inner peripheral surface of the inner hole 25 of the rotor iron core 24 in a state orthogonal to the q-axis, the two inner peripheral surfaces 27b and 27g rising from both sides of this inner peripheral surface 27a toward the outer periphery of the rotor iron core 24 face each other across the d-axis, the two inner peripheral surfaces 27c and 27f continuous with these inner peripheral surfaces 27b and 27g extend toward the q-axis, respectively, and the remaining two inner peripheral surfaces 27d and 27e continuous with the inner peripheral surfaces 27c and 27f gradually incline toward the q-axis in a manner such that they become closer to the outer peripheral surface of the rotor iron core 24. Each void hole 27 is larger than each void hole 26. These void holes 26 and 27 serve as passages for the refrigerant (cooling oil) and also contribute to reduce weight of the rotor iron core 24.

The rotor iron core 24 comprises, in each magnetic pole, a fan-shaped outer peripheral side iron core portion (also referred to as an outer peripheral area or a first iron core portion) 24a located between the two magnet holding slots 34 in the circumferential direction, an inner peripheral side iron core portion (also referred to as an inner peripheral area or a second iron core portion) 24b located between the two magnet holding slots 34 and the inner hole 25 (shaft 22), and a bridge 60 connecting this outer peripheral side iron core portion 24a and the inner peripheral side iron core portion 24b.

The bridge 60 comprises two center magnetic gaps 40 arranged side by side in a radial direction between the two inner peripheral side magnetic gaps 34b, a first center bridge 50a passed between the outer peripheral side iron core portion 24a and the inner peripheral side iron core portion 24b at a position between one of the inner peripheral side magnetic gap 34b and each center magnetic gap 40, another first center bridge 50a passed between the outer peripheral side iron core portion 24a and the inner peripheral side iron core portion 24b at a position between the other inner peripheral side magnetic gap 34b and each center magnetic gap 40, and a pillar-shaped second center bridge (coupling element) 50b extending almost orthogonal to the d-axis between each center magnetic gap 40 and passed between the two first center bridges 50a to connect the first center bridges 50a to each other.

The two center magnetic gaps 40 are formed by penetrating the rotor iron core 24 in the axial direction. The two center magnetic gaps 40 are formed in a rectangular cross-sectional shape of approximately the same size as each other.

The two first center bridges 50a are formed in a pillar shape extending approximately parallel to the d-axis. Each of the first center bridges 50a extends from a position connecting the inner edge 35b of the magnet loading area 34a and an end edge 41a on the central axis C side of the center magnetic gap 40 to a position connecting the outer edge 35a of the magnet loading area 34a and an end edge 41b on the outer peripheral side of the center magnetic gap 40. The width of each first center bridge 50a in the circumferential direction of the rotor iron core 24 is the same as each other, and is set to be as thin as possible to reduce leakage of magnet magnetic flux, but at a minimum required condition for adapting to the centrifugal stress generated in each of the first center bridges 50a.

The second center bridge 50b, which serves as the coupling element, is, for example, formed in a pillar shape extending across the d-axis and the center magnetic gaps 40, and is connected to the longitudinal center portion of one of the first center bridge 50a and the longitudinal center portion of the other first center bridge 50a. The width of the second center bridge 50b in the radial direction of the rotor iron core 24 is almost the same as the width of each first center bridge 50a in the circumferential direction of the rotor iron core 24. The second center bridge 50b is connected the two first center bridges 50a to increase the strength of the first center bridges 50a and the bridge 60, and to also serve a role of connecting the outer peripheral side iron core 24a and the inner peripheral side iron core 24b of the rotor iron core 24.

As described above, the bridge 60 of the rotor iron core 24 connects the two first center bridges 50a by the second center bridge 50b. This makes it possible to improve the strength of the first center bridges 50a without making it thicker. Therefore, even in a case where a circumferential electromagnetic force is applied to the outer peripheral side iron core portion 24a of the rotor iron core 24 under a situation where a large torque is generated, the outer peripheral side iron core 24a can be stably supported by the first center bridges 50a and the second center bridge 50b. For example, a movement of the two first center bridges 50a collapsing in the same direction can be suppressed by the connection of the second center bridge 50b. At the same time, since the leakage of magnet magnetic flux is reduced, it possible to increase the magnet torque generated per magnet weight. This makes it possible to improve the torque and output of a rotary electric machine of the same size, or to reduce the size and weight of the rotary electric machine while maintaining the same output. Furthermore, by reducing the weight of the magnets used, it is possible to reduce the cost of the rotor.

In particular, the rotor iron core 24 has two magnet holding protrusions 70 extending from a middle portion of each first center bridge 50a to each magnet holding slot 34 for each magnetic pole.

These magnet holding portions 70 include a standing portion 70a that rises from the center portion of each of the first center bridges 50a in the longitudinal direction toward each magnet holding slot 34, and, also, a bar-shaped portion 70b extending from the standing portion 70a through each inner peripheral side magnetic gap 34b to each magnet holding slot 34, where a distal end of the bar-shaped portion 70b comes in contact with substantially the center portion of the non-magnetic pole surface Mc of each permanent magnet M. The distal end of the bar-shaped portion 70b has a curved surface shape.

By the bar-shaped portion 70b of each magnet holding portion 70, the area of each inner peripheral side magnetic gap 34b is formed in a shape that is divided in two in the radial direction.

In the permanent magnet M in each magnet holding slot 34, the magnetic pole surface Ma abuts the outer edge 35a of the magnet loading area 34a, the magnetic pole surface Mb abuts the inner edge 35b of the magnet loading area 34a, the non-magnetic pole surface Mc abuts the magnet holding protrusion 70, and the non-magnetic pole surface Mc abuts the magnet holding protrusion 34d. As a result, the permanent magnet M is held in the magnet loading area 34a in a state where its position in the longitudinal direction is positioned.

Figure 3:
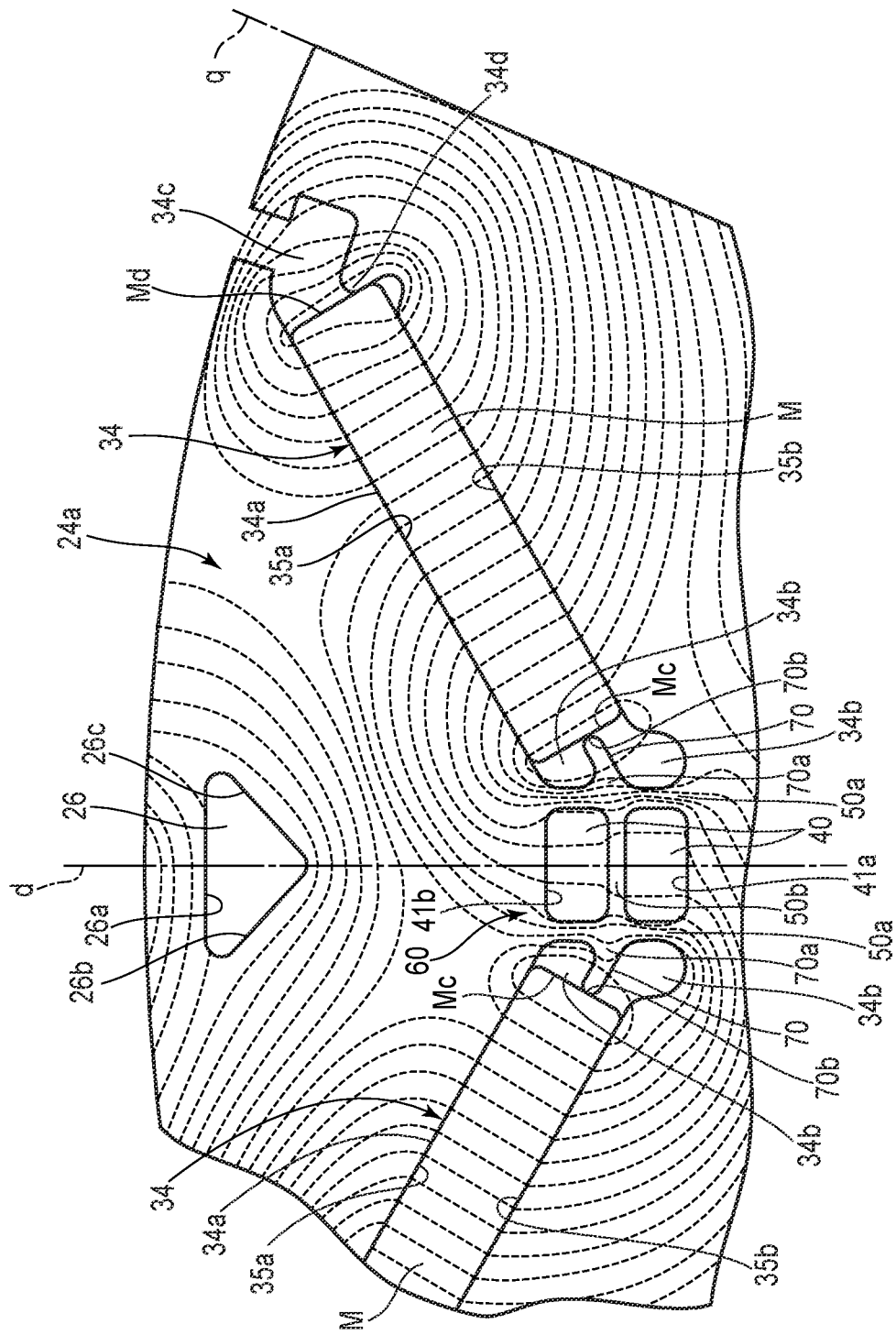
FIG. 3 shows a flow of magnetic flux in a main part of FIG. 2.

When the rotor iron core 21 and each of the permanent magnets M become a high temperature due to high load operation of the rotary electric machine 10, etc., a demagnetizing field due to weak field control, etc., may be applied from the stator 10 to the rotor iron core 24. An actual measurement result of the flow of the magnetic flux (magnetic flux of the demagnetizing field and the magnet magnetic flux) generated in the rotor iron core 24 in the case where this demagnetizing field is applied is shown by a broken line in FIG. 3.

In each of the first center bridges 50a, an outer peripheral side end portion (one end portion in the longitudinal direction) between each inner peripheral side magnetic gap 34b and the center magnetic gap 40 located on the outer peripheral side is saturated with magnet magnetic flux, and an inner peripheral side end portion (the other end portion in the longitudinal direction) between each inner peripheral side magnetic gap 34b and the center magnetic gap 40 located on the inner peripheral side also becomes saturated with magnet magnetic flux. In other words, even if a demagnetizing field is applied to the rotor iron core 24, the magnetic flux of the demagnetizing field is blocked at both end portions of each of the first center bridges 50a (the outer peripheral side end portion and the inner peripheral side end portion), and does not flow into each magnet holding portion 70 in the middle portion of each of the first center bridges 50a.

Although the magnetic flux of the demagnetizing field passing through each permanent magnet M may be considered to head toward the distal end of the bar-shaped portion 70b of each magnet holding portion 70, since each of the first center bridges 50a in which each magnet holding portion 70 exists is in a clogged state, that is, in a state of high magnetic resistance, at both end portions (the outer peripheral side end portion and the inner peripheral side end portion) due to saturation of magnet magnetic flux, it is also possible to avoid a situation in which the magnetic flux of the demagnetizing field passing through each permanent magnet M flows into the bar-shaped portion 70b of each magnet holding portion 70.

Therefore, a problem such that the magnetic flux of the demagnetizing field passes through each magnet holding portion 70 and passes through each permanent magnet M will not occur.

The magnetic resistance of each of the first center bridges 50a becomes larger as the standing portion 70a of each magnet holding portion 70 becomes farther from both end portions of each of the first center bridges 50a (the outer peripheral side end portion and the inner peripheral side end portion), that is, as the standing portion 70a of each magnet holding portion 70 becomes closer to the center portion of each of the first center bridges 50a.

Note that, when observing the outer peripheral side of each permanent magnet M and its peripheral part, the magnet holding protrusion 34d in contact with the non-magnetic pole surface Md protrudes into the outer peripheral side magnetic gap 34c. The distance between the distal end of this magnet holding protrusion 34d and the inner edge 35a of the magnet loading area 34a is shorter than the distance between the inner edges 35a and 35b of the magnet loading area 34a. Therefore, the magnetic flux may easily pass through between the distal end of the magnet holding protrusion 34d and the inner edge 35a of the magnet loading area 34a. Accordingly, a possibility remains that the magnetic flux of the demagnetizing field may pass through each magnet holding protrusion 34d and pass through each permanent magnet M.

However, as described above, since the magnetic flux of the demagnetizing field does not pass through each magnet holding portion 70 in contact with the non-magnetic pole surface Mc on the inner peripheral side of each permanent magnet M, irreversible demagnetization of each permanent magnet M can be avoided accordingly.

As a countermeasure against irreversible demagnetization, there are measures such as adopting a permanent magnet M with high coercive force or increasing the thickness of the permanent magnet M (the thickness between the magnetic pole surfaces Ma and Mb). However, these measures increase the cost and increase the size of the rotary electric machine 10. In the present embodiment, since irreversible demagnetization can be avoided without taking such measures, problems such as cost increase or size increase of the rotary electric machine 10 will not occur.

In particular, both end portions of the second center bridge 50b are connected to portions on the opposite side of portions at which the standing portion 70a of each magnet holding portion 70 exists in each of the first center bridges 50a in the circumferential direction of the rotor iron core 24. As a result, the centrifugal stress generated in each of the first center bridges 50a is in equilibrium between the side where the standing portion 70a of the magnet holding portion 70 exists and the side where the second center bridge 50b exists. Therefore, deformation such as deflection of each of the first center bridges 50a can be prevented.

[2] Second Embodiment

Figure 4:
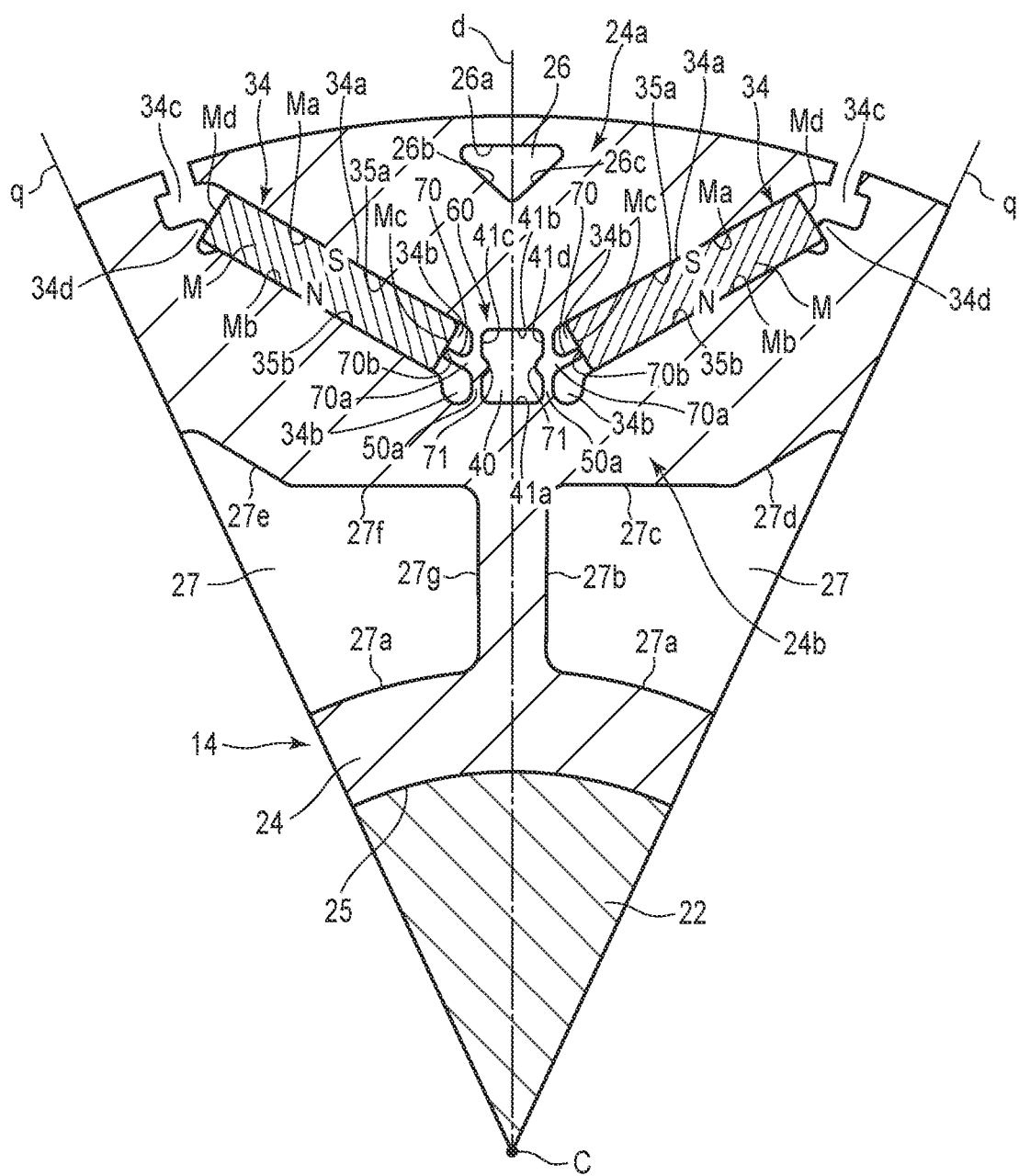
FIG. 4 is an enlarged cross-sectional view of a part of a rotor of a rotary electric machine according to a second embodiment.

A configuration in which there is no second center bridge 50b between each first center bridge 50a in the above first embodiment will be explained as a second embodiment with reference to FIG. 4. In this second embodiment, the same symbols are given to the same parts as in the first embodiment, and the detailed explanation thereof is omitted.

A rotor iron core 24 has one center magnetic gap 40 between each of the first center bridges 50a for each magnetic pole.

The center magnetic gap 40 has a rectangular cross-sectional shape configured by an end edge 41a on the central axis C side, an end edge 41b on the outer peripheral side, and side edges 41c and 41d adjacent to each of the first center bridges 50a, and is formed over the entire length of the rotor iron core 24 in the axial direction. Of the four end edges 41a to 41d forming the center magnetic gap 40, the end edge 41a on the central axis C side and the end edge 41b on the outer peripheral side face each other almost parallelly in a state orthogonal to the d-axis, and the side edges 41c and 41d adjacent to each of the first center bridges 50a face each other almost parallelly across the d-axis.

Each of the first center bridges 50a has a protruding portion 71 that protrudes in a curved shape toward the d-axis side at a portion on the opposite side of a portion where a standing portion 70a of each magnet holding portion 70 exists in the circumferential direction of the rotor iron core 24. With the formation of this protruding portion 71, the side edges 41c and 41d of the center magnetic gap 40 are recessed on the d-axis side in a curved shape.

Due to the presence of these protruding portions 71, the centrifugal stress generated in each of the first center bridges 50a is equilibrated on the side where the magnet holding portion 70 exists and on the side where the protruding portion 71 exists. This can prevent deformations such as bending of each of the first center bridges 50a. As a result, the width of each of the first center bridges 50a, excluding the magnet holding portion 70 and the protruding portion 71, can be made as narrow as possible.

Figure 5:
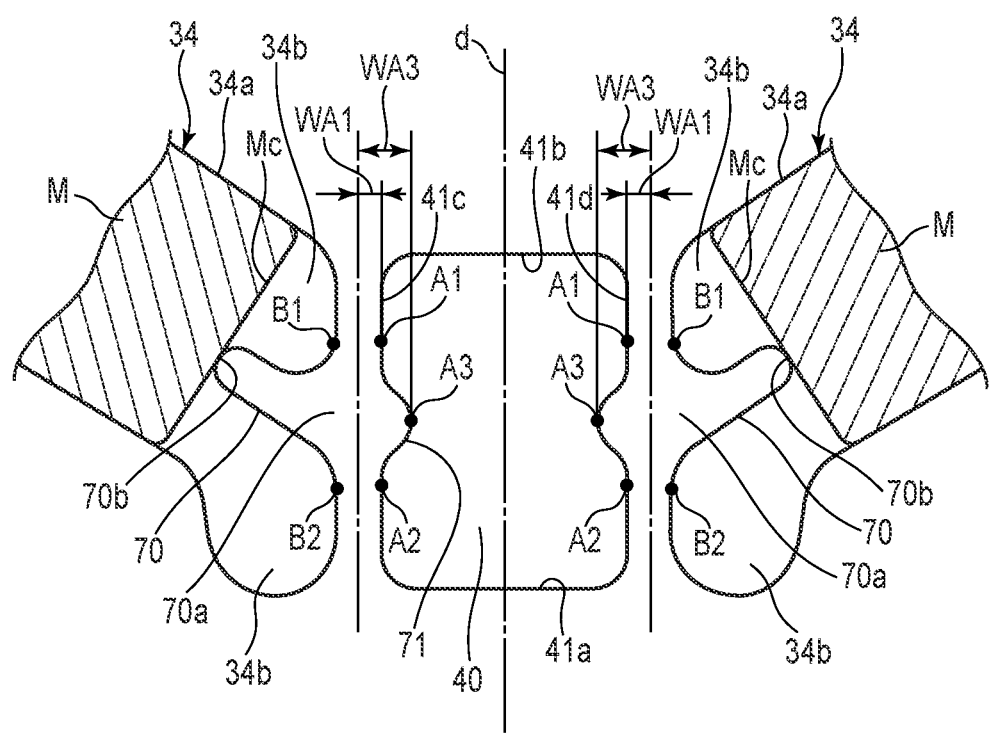
FIG. 5 is an enlarged view of a main part of FIG. 4.

As shown in FIG. 5, in each of the first center bridges 50a, in a case where an inflection point where the shape of each protruding portion 71 changes from linear to a curved shape in an area on the outer peripheral side of each protruding portion 71 (an inflection point where the shape of the side edges 41c and 41d of the center magnetic gap 40 changes from linear to a curved shape) is A1, A1, an inflection point where the shape of each protruding portion 71 changes from linear to a curved shape in an area on the inner peripheral side of each protruding portion 71 (an inflection point where the shape of the side edges 41c and 41d of the center magnetic gap 40 changes from linear to a curved shape) is A2, A2, a point where the curved deformation of each protruding portion 71 is furthest from the magnet holding portion 70 is A3, A3, an inflection point where the standing portion 70a of each magnet holding portion 70 begins to rise in a curved shape in an area on the outer peripheral side of each magnet holding portion 70 is B1, B1, and an inflection point where the standing portion 70a of each magnet holding portion 70 begins to rise in a curved shape in an area on the inner peripheral side of each magnet holding portion 70 is B2, B2, the inflection points A1, A1 and B1, B1 exist at a first distance from the central axis C, the inflection points A2, A2 and B2, B2 exist at a second distance (<first distance) from the central axis C, and points A3, A3 exist at a third distance (shorter than the first distance and longer than the second distance) from the central axis C.

In each of the first center bridges 50a, in a case where a distance from a straight line connecting a midpoint of the inflection points A1 and B1 and a midpoint of the inflection points A2 and B2 to the point A1 is WA1, and a distance from the straight line to point A3 is WA3, for example, a relationship WA3>(WA1×2) (=WA3 is greater than twice the WA1) is established. This relationship is an example, and can be adjusted appropriately according to the actual shape and size of each of the first center bridges 50a.

Due to the presence of these protruding portions 71, the centrifugal stress generated in each of the first center bridges 50a is equilibrated on the side where the magnet holding portion 70 exists and on the side where the protruding portion 71 exists. This can prevent deformations such as bending of each of the first center bridges 50a. As a result, an effect of reducing the width of each of the first center bridges 50a, excluding the magnet holding portion 70 and the protruding portion 71, can be obtained.

The other configurations and effects are the same as in the first embodiment.

[3] Third Embodiment

A configuration in which each first center bridge 50a does not have a protruding portion 71 in the second embodiment will be explained as a third embodiment with reference to FIG. 6. In this third embodiment, the same symbols are given to the same parts as in the second embodiment, and the detailed explanation thereof is omitted.

Each of the first center bridges 50a has a magnet holding portion 70 on a side corresponding to each magnet holding slot 34, but does not have a protruding portion 71 on a side corresponding to a center magnetic gap 40. Since there is no protruding portion 71, end edges 41c and 41d of the center magnetic gap 40 are flat.

In a case where each of the first center bridges 50a is sufficiently strong without each protruding portion 71, and there is no concern about deformations such as bending of each of the first center bridges 50a, the configuration of the present embodiment may be adopted.

Other configurations and effects are the same as in the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the number of magnetic poles, dimension, and shape, etc., of the rotor is not limited to the above-mentioned embodiments, and may be changed in various ways in accordance with the design. The number of permanent magnets installed in each magnetic pole of the rotor is not limited to two, and can be increased as needed. The first center bridge that configures the bridge is not limited to two, and can be three or more.

What is claimed is:

1. A rotor of a rotary electric machine comprising:
a rotor iron core including a plurality of magnetic poles lined up in a circumferential direction around a central axis, a plurality of magnet holding slots arranged at intervals in the circumferential direction for each of these magnetic poles, an outer peripheral side iron core portion located between each of the magnet holding slots in the circumferential direction for each of the magnetic poles, an inner peripheral side iron core portion located between each of the magnet holding slots and the central axis for each of the magnet poles, a plurality of bridges passed between the outer peripheral side iron core portion and the inner peripheral side iron core portion at a location between each of the magnet holding slots for each of the magnetic poles, and a plurality of magnet holding protrusions extending from a middle portion of each of the bridges to each of the magnet holding slots in each of the magnetic poles; and
a plurality of permanent magnets that is accommodated in each of the magnet holding slots and in contact with each of the magnet holding protrusions.

2. The rotor of the rotary electric machine of claim 1, wherein each of the permanent magnets has a pair of magnetic pole surfaces and a pair of non-magnetic pole surfaces intersecting the magnetic pole surfaces, one of the pair of non-magnetic pole surfaces being in contact with each of the magnet holding protrusions.

3. The rotor of the rotary electric machine of claim 2, wherein each of the magnet holding protrusions includes a standing portion that rises from each middle portion of each of the bridges toward each of the magnet holding slots, and also includes a bar-shaped portion that extends from the standing portion to each of the magnet holding slots, a distal end of the bar-shaped portion being in contact with the non-magnetic pole surface of each of the permanent magnets.

4. The rotor of the rotary electric machine of claim 1, wherein the rotor iron core further includes, for each of the magnetic poles, a second bridge passed between the middle portions of each of the bridges.

5. The rotor of the rotary electric machine of claim 1, wherein each of the bridges includes a protruding portion at a portion on an opposite side of a portion at which each of the magnet holding protrusions exists in the circumferential direction.

* * * * *